S. A. MOSS.
GAS TURBINE.
APPLICATION FILED APR. 4, 1906.

969,760.

Patented Sept. 6, 1910.
6 SHEETS—SHEET 1.

Witnesses:
Marcus L. Byng.
Alex F. Macdonald.

Inventor,
Sanford A. Moss,
By Albert ...
Atty.

S. A. MOSS.
GAS TURBINE.
APPLICATION FILED APR. 4, 1906.

969,760.

Patented Sept. 6, 1910.
6 SHEETS—SHEET 3.

Witnesses:
Marcus L. Byng.
Alex F. Macdonald.

Inventor,
Sanford A. Moss,
By
Att'y.

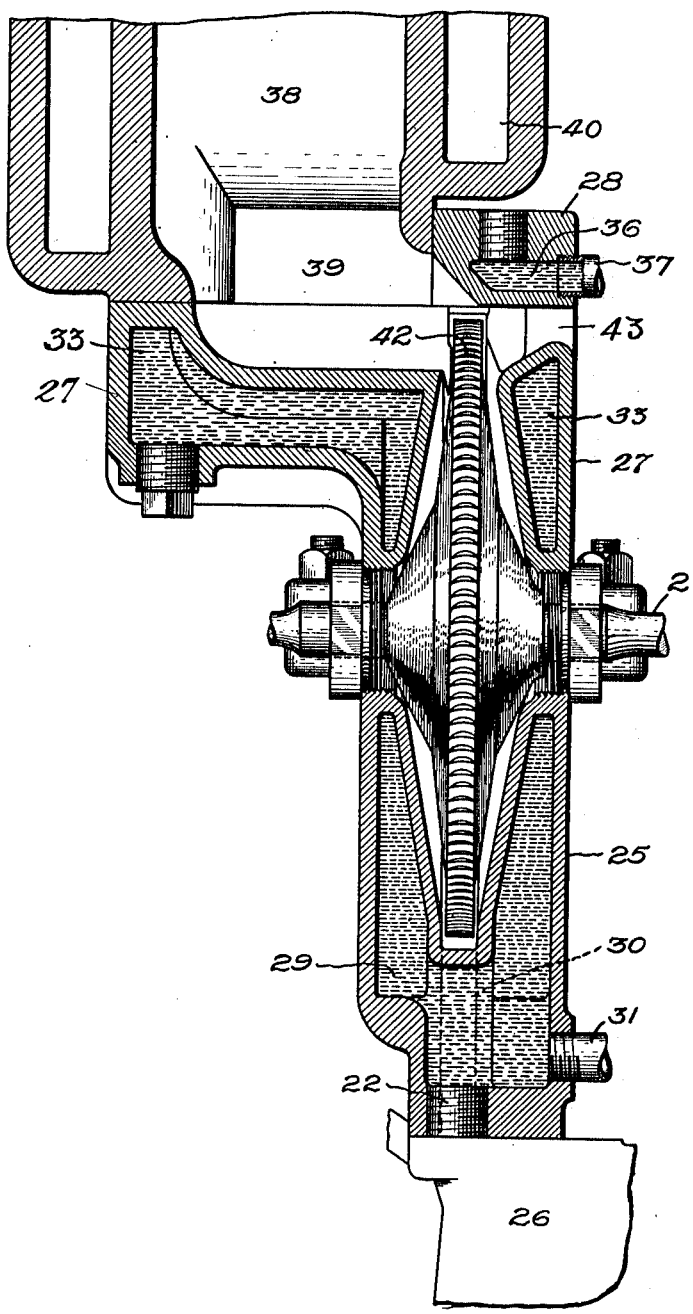

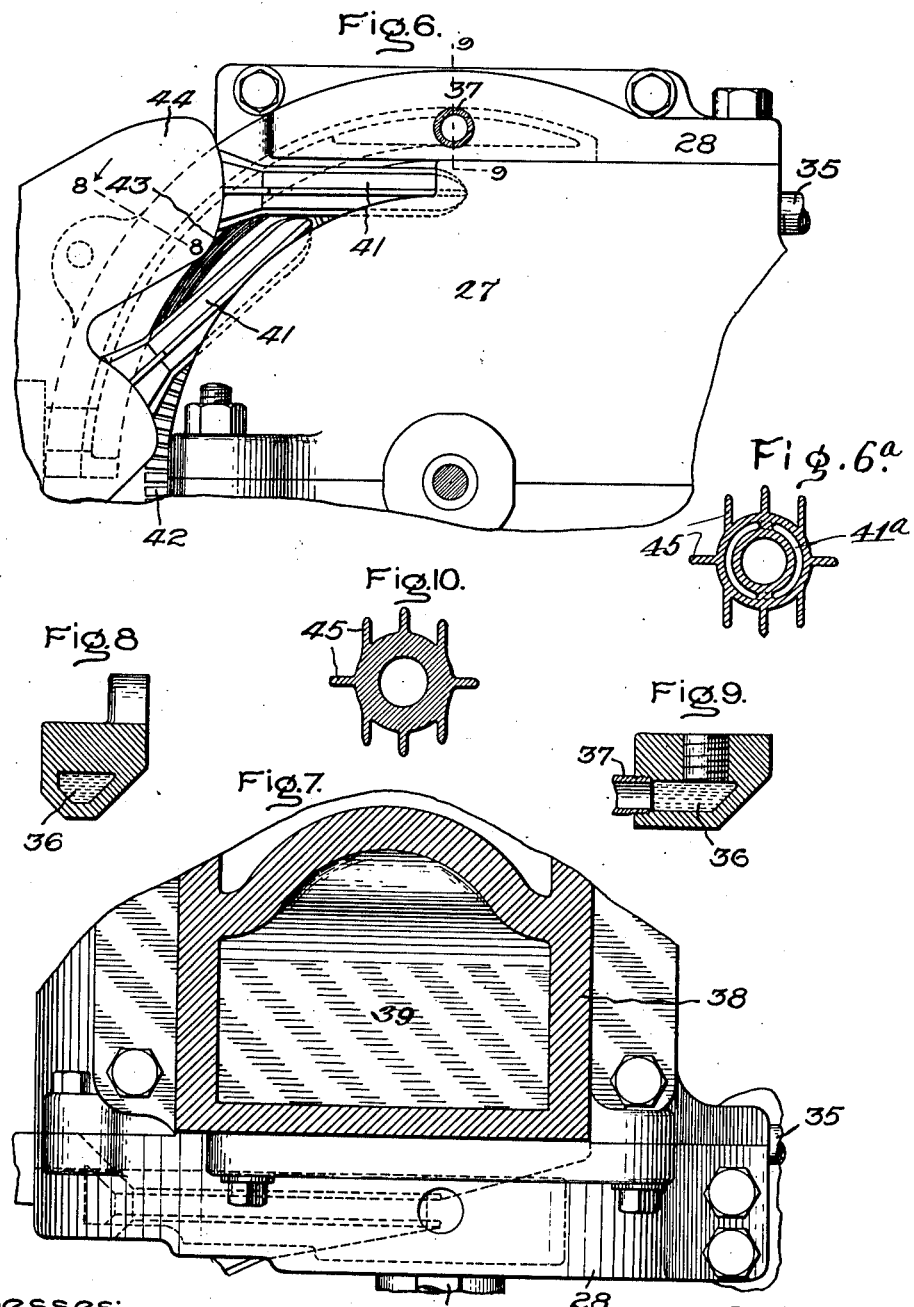

S. A. MOSS.
GAS TURBINE.
APPLICATION FILED APR. 4, 1906.

969,760.

Patented Sept. 6, 1910.
6 SHEETS—SHEET 6.

Witnesses:
Marcus L. Byng.
Alex F. Macdonald.

Inventor,
Sanford A. Moss,
By Albert G. Davis
Att'y.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

GAS-TURBINE.

969,760.  Specification of Letters Patent.  Patented Sept. 6, 1910.

Original application filed December 31, 1904, Serial No. 239,089. Divided and this application filed April 4, 1906. Serial No. 309,744.

*To all whom it may concern:*

Be it known that I, SANFORD A. MOSS, a citizen of the United States, residing at Lynn, county of Essex, State of Massachusetts, have invented certain new and useful Improvements in Gas-Turbines, of which the following is a specification.

The present application is a division of my prior pending application Serial No. 239,089, filed Dec. 31, 1904, which division is made at the requirement of the United States Patent Office, under the provisions of Rules 41 and 42.

The present invention relates to gas turbines, and has for its object to improve their construction and operation, particular reference being made to the means for preventing the hot gases from injuring the working parts.

Figure 1:
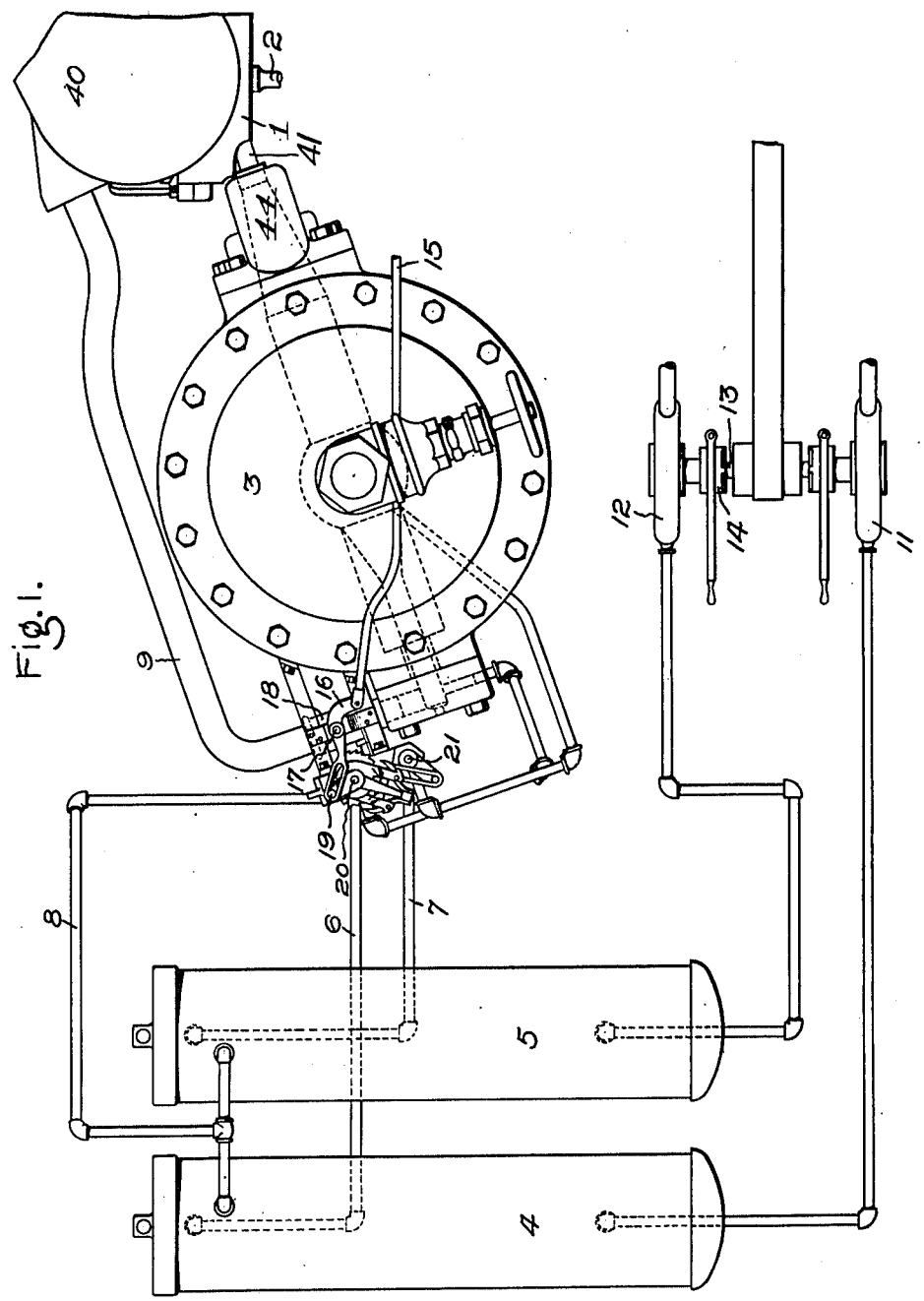
Figure 2:
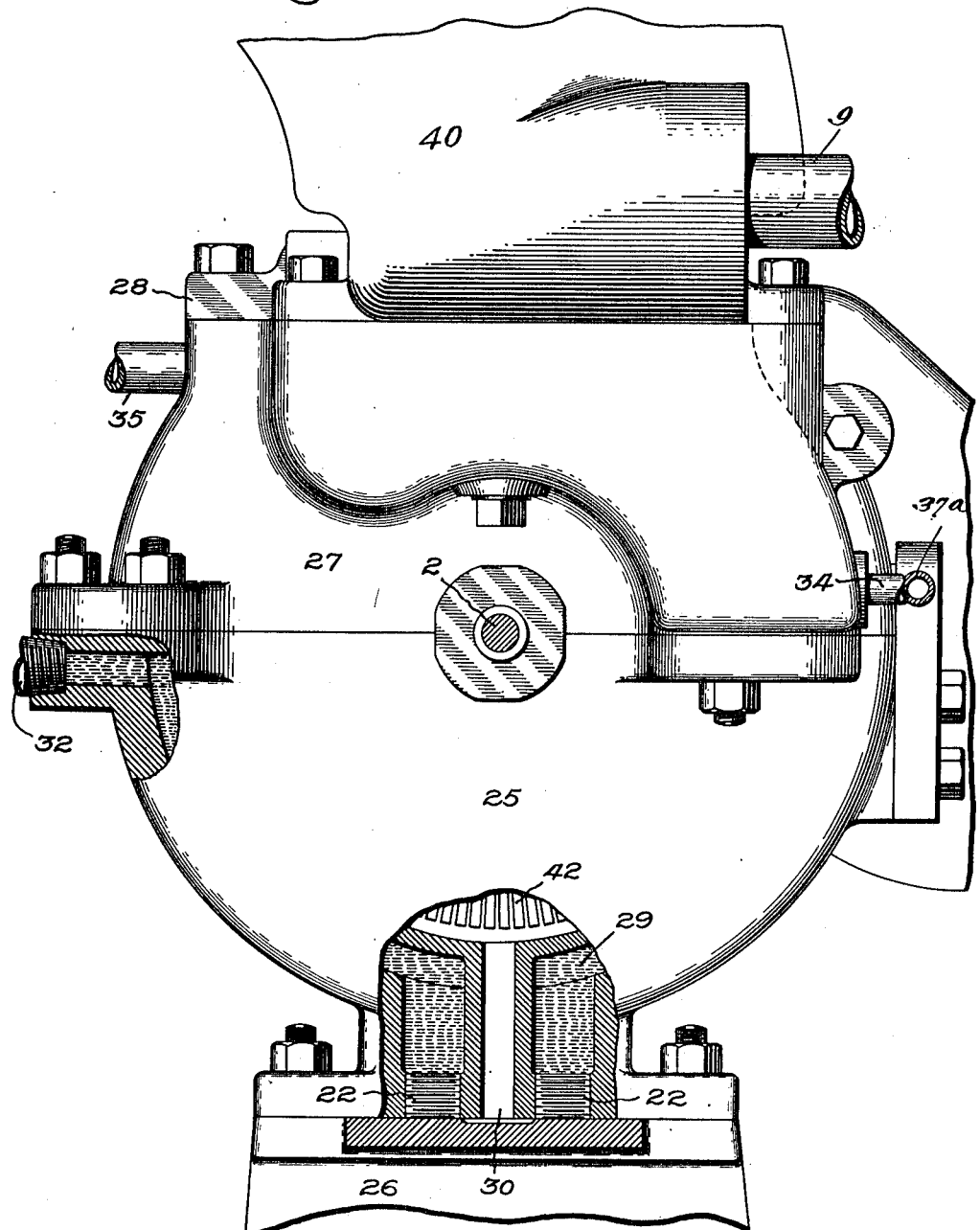
Figure 3:
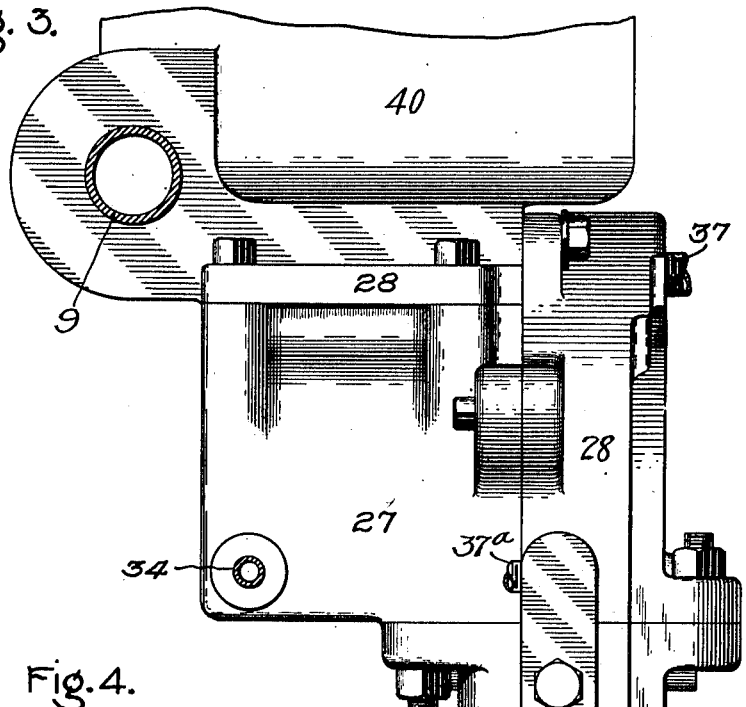
Figure 4:
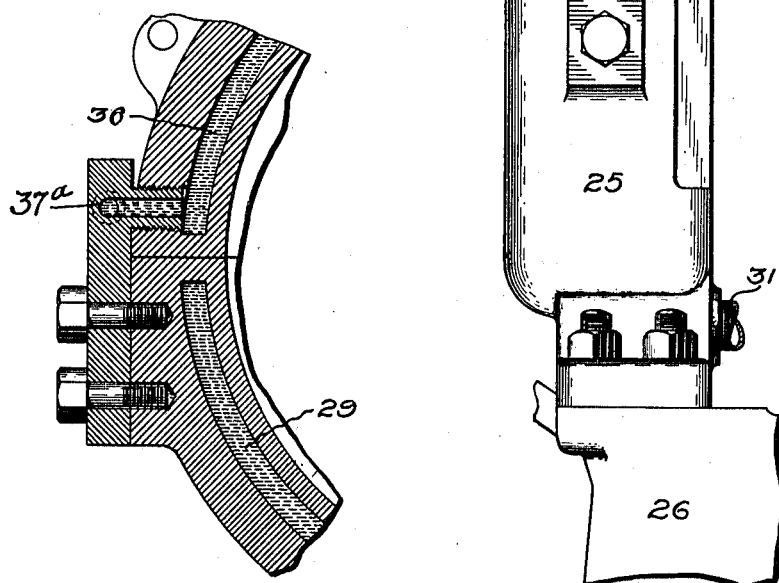
Figure 11:
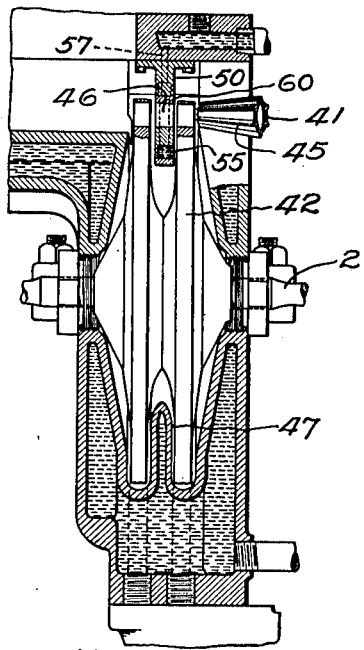
Figure 12:
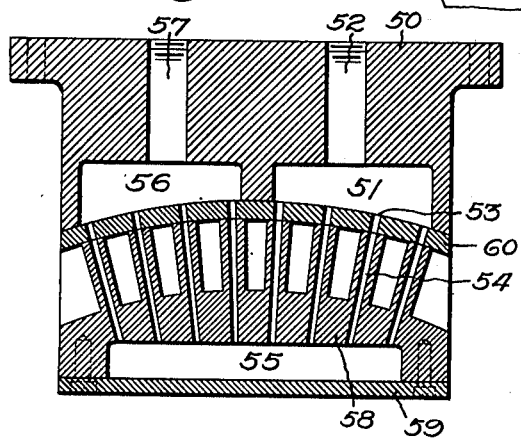
Figure 13:
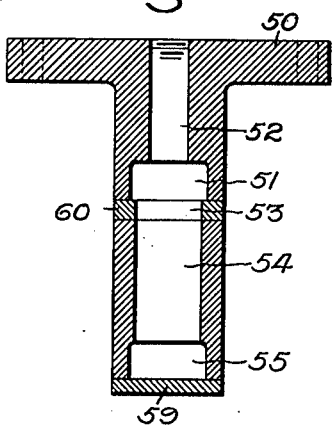

In the accompanying drawings which are illustrative of my invention, Figure 1 is a plan view of a gas turbine and combustion chamber, together with the necessary auxiliaries; Fig. 2 is a side elevation of the turbine showing certain of the parts broken away to show the water-circulating chambers; Fig. 3 is a view in side elevation of the turbine; Fig. 4 is a detail sectional view showing a portion of the water jacket for the casing; Fig. 5 is an axial section of the turbine which is provided with a single row of wheel buckets; Fig. 6 is a detail view in elevation of the turbine showing the openings arranged to receive the expanding nozzles discharging the products of combustion against the bucket wheel; Fig. 6ª is a detail sectional view of a nozzle having radiating vanes and a water circulating system for cooling it; Fig. 7 is a plan view, partly in section, of the turbine; Fig. 8 is a section of the nozzle cover taken on line 8—8 of Fig. 6; Fig. 9 is a section of said cover taken on the line 9—9 of Fig. 6; Fig. 10 is a cross-section of one of the nozzles showing the radiating plates for cooling purposes; Fig. 11 is a horizontal section of a turbine having two rows of wheel buckets for fractionally abstracting the velocity of the gas from the admission nozzle; and Figs. 12 to 15 inclusive are detail views showing the water circulation for the intermediate buckets.

Referring to Fig. 1, 1 is a gas turbine of suitable construction having a main shaft 2 that is connected directly or indirectly to the apparatus to be driven. 3 represents the combustion chamber which receives fuel from the tank 4 and water from the tank 5. The former tank is connected to the combustion chamber by the pipe 6, and the latter by the pipe 7. In order to equalize the pressures in the two tanks and also in the air or gas supply and the combustion chamber, an equalizing pipe 8 is connected to both tanks and to the pipe 9 conveying air from the conduit 40 leading from the regenerator or other source of supply to the combustion chamber. Fuel is supplied to the oil tank by a pump 11 and water to the tank 5 by the pump 12. These pumps may with advantage be of the centrifugal type and the rotating elements thereof are mounted on the shaft 13, the latter being belted or otherwise connected to the power shaft 2 of the turbine, or the pumps may be separately driven. Each pump is provided in the present illustration with a clutch 14 by means of which the rotating elements can be started and stopped. The rod 15 is connected to a speed-responsive device, not shown, driven by the turbine. The left-hand end of the rod is connected to a lever 16, and the latter is mounted directly on the spindle 17 of the valve 18 controlling the passage of air from the pipe 9 into the combustion chamber. The opposite end of the lever 16 is slotted to receive the pin 19, the latter acting through suitable mechanism on the spindle 20 of the fuel-controlling valve. The admission of cooling fluid such as water to the combustion chamber is controlled by a suitable valve having a stem 21 that is actuated through intermediate mechanism by the lever 16.

The governing mechanism forms the subject matter of a separate application and for that reason is not specifically described and illustrated herein.

In Figs. 2, 5 and 6 is shown a gas turbine having a single wheel of the Laval type though I may use one or more wheels of other constructions. The wheel is inclosed in a suitable casing, Figs. 2 and 3, comprising three principal parts or sections,—a lower section 25 that is provided with a foot or other support that rests upon a foundation 26, an upper section 27, and a nozzle section 28, the latter being bolted or otherwise secured to the upper and lower sections.

The lower section of the wheel casing is provided with a chamber 29 containing water or other cooling medium. The cooling system for the lower section may be, and preferably is, independent of the cooling system for the upper section or sections of the casing. The inner wall of the lower section is made relatively thin and closely surrounds the buckets so as to reduce the rotation losses due principally to the fan-like action of the buckets and also to abstract the heat therefrom and from the wheel itself. The interior of said lower section is provided with a conduit 30 which extends through the water-containing chamber 29 and communicates with the atmosphere at a point below the foot or support to drain off any water that may collect in the wheel chamber. Water enters the lower cooling chamber through the conduit 31 (Figs. 3 and 5) and leaves through a suitable passage such as 32, Fig. 2. In the foot or support for the lower section is provided one or more openings for permitting the core to be withdrawn after the casing is formed. These openings are closed by plugs 22, as are similar openings in the upper section and cover. The upper surface of the lower section is finished on a plane passing through the axis of the wheel shaft 2, and mounted on top thereof is the upper section 27 of the casing containing a chamber 33. This chamber extends on both sides of the wheel, and water or other cooling fluid is admitted thereto by the pipe 34, Figs. 2 and 3, and escapes therefrom by the pipe 35, Figs. 2 and 6.

The nozzle section 28 is provided with a chamber 36 (Fig. 5) to which water or other cooling fluid is admitted by the pipe 37 and escapes by the pipe 37$^a$. It will thus appear that the cooling chamber of the wheel casing and also that of the nozzle section forming a part of said casing are provided with their own inlets and outlets so that the amount of cooling water passing through any one chamber can be controlled independently of that passing through another. Further that the piping to one chamber can be disconnected without affecting that to the other. The upper surface of the upper section of the casing is finished, and bolted thereto is a double conduit having a central passage or conduit 38 that conveys the waste products of combustion escaping from the wheel buckets to a regenerator or other exhaust. The bucket wheel of the turbine and the nozzles are so situated that the gases exhausting therefrom enter the chamber 39 and pass directly to the regenerator or other exhaust. The conduit 38 is surrounded by an annular conduit 40 through which air from the compressor preferably passes prior to entering the combustion chamber, for the purpose of increasing its temperature. Air is conveyed from the conduit 40 to the combustion chamber by the pipe 9, Fig. 1.

One or more nozzles 41 (Fig. 6) are provided for directing the products of combustion against the wheel buckets 42, the said products acting by impact to rotate the bucket wheel. The nozzles are so constructed that they extend through the diverging opening 43 between the upper half of the casing and the nozzle cover 28. I have found it desirable to leave a space between the nozzles and the walls of the casing and cover through which a certain amount of air is drawn after the fashion of an injector when the turbine is in operation. This air does not act to drive the bucket wheel but tends to reduce the temperature of the parts. The air in passing over the surface of the nozzles tends to prevent the temperature from rising above a certain predetermined degree. In some instances where the temperature of the exhaust gases is lower I may so arrange the nozzle and parts of the wheel casing that no space is provided for admitting air. Instead of depending upon the air alone to keep the temperature of the nozzle or nozzles down, I may use a water cooling jacket 41$^a$, Fig. 6$^a$, such as is above described in connection with the wheel casing, or I may depend upon the air as well as the water circulation for this purpose.

The nozzles 41 are mounted upon a support 44. The latter may be carried by the combustion chamber or other suitable support. As shown in Fig. 10 the nozzles may be provided with radiating plates 45. When radiating plates are employed it is desirable to leave a space between them and the surrounding casing to admit a supply of air. By test I have found that the air-cooled nozzles above referred to will satisfactorily withstand a combustion chamber temperature which causes the lining of the chamber to melt. The nozzles may be lined with a suitable heat-resisting material if desired. The radiating plates in addition to acting as such serve to direct incoming currents of air.

In Fig. 11 is shown a turbine comprising two rows of wheel buckets 42 with a row of intermediate buckets 46 between them. With this arrangement the number of rotations per unit of time is materially lowered over the construction shown in Fig. 5 because the velocity of the gases is abstracted by two successive fractions or operations instead of by a single operation. The gases are admitted to the buckets by one or more nozzles 41 of suitable construction. The wheels are mounted upon the shaft 2, and the latter is supported in suitable bearings carried by the side walls of the casing. A cooling jacket is provided which may be of the same general construction as that previously described. It is preferable with constructions involving more than a single row of wheel buckets to extend the casing between the rows of wheel buckets, as at 47, and chamber out said portion so as to permit the water to freely circulate. Where stationary or intermediate buckets are employed for reversing the direction of flow of the gases from one wheel to the next, I have found that they are liable to be unduly heated unless special means are employed for cooling them. In order to effectually cool the buckets I provide an arrangement whereby water or other cooling fluid is arranged to circulate around or through the buckets, or both, as desired.

50 represents a support for intermediate buckets, which is attached to the casing of the turbine. The support may cover a small or a large portion of the circumference of the turbine wheel, depending upon the number of intermediate buckets it carries. In the support are formed one or more chambers 51 which receive the cooling fluid. In the construction illustrated water enters the chamber 51 from the conduit 52 and passes through a number of small passages 53 in the bucket cover which register with the corresponding passages 54 in the center of the buckets. The bucket passages communicate with the common chamber 55 located between the buckets and the wheel shaft. Assuming that the water is delivered to the chamber 51 under pressure, it will pass inward through some of the passages 53 and 54 into the chamber 55, and thence out through others of the passages 54 and 53 into the chamber 56, the latter discharging into the conduit 57. Instead of providing each of the buckets with the fluid-carrying passages, some of the buckets may be solid. This will depend largely upon the temperature of the gases passing through the turbine. It is preferable however to provide a cooling arrangement for each bucket. Instead of causing the cooling fluid to flow inward into the chamber 55 and then out, I may so arrange the receiving and discharge conduits that the cooling water flows in the same direction through all of the passages 53 and 54.

The construction of the intermediates can be widely varied without departing from my invention. In the present arrangement the chamber 55 is formed by coring out the under side of the bucket-carrying element 58 and securing a plate 59 to its under side. The plate can be made integral with the buckets if desired.

Figure 14:
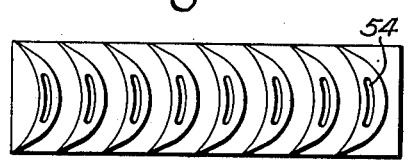

In Fig. 14 is shown in plan view a form of bucket suitable for carrying out the invention. The cross-sectional area and position of the fluid-carrying passages 54 with respect to the buckets is clearly shown. The number of buckets may be increased or decreased to suit the conditions of operation. As a general proposition it may be stated that there will be fewer intermediate buckets at the high-pressure end of the turbine than at the low.

Figure 15:
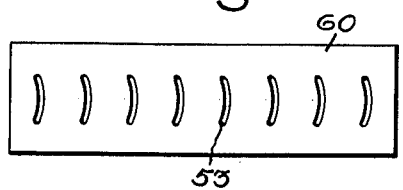

In Fig. 15 is shown a bucket cover 60 containing the fluid-carrying passages 53 that register with or receive water from and discharge it to the bucket passages 54. The buckets may be cast, drop-forged, extruded, cut from solid stock or made detachable as desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. A gas turbine having a combustion chamber, rows of wheel buckets for abstracting the energy of the gas received from the combustion chamber, in combination with a nozzle discharging products of combustion against the buckets to produce rotation, intermediate buckets, passages extending longitudinally through the intermediate buckets for conveying a cooling fluid to reduce the temperature, means separating the outer ends of the passages into sets, conduits that convey the cooling fluid to and from said sets, and conduit means connecting the inner ends of the passages.

2. A gas turbine having a combustion chamber and rows of wheel buckets for fractionally abstracting the energy received from the combustion chamber, in combination with intermediate buckets located between the wheel buckets, a segmental support therefor, a chamber in the support, and conduits for conveying cooling fluid to and from the chamber which pass through said intermediate buckets.

3. A gas turbine having a combustion chamber and rows of wheel buckets for fractionally abstracting the energy received from the combustion chamber, in combination with intermediate buckets located between the wheel buckets, passages extending through the intermediate buckets, conduits conveying fluid to certain of said passages and from others of the passages, and conduit means connecting said sets of passages.

4. A gas turbine having a combustion chamber, rows of wheel buckets for fractionally abstracting the energy received from the combustion chamber, a wheel shaft, and a casing, in combination with intermediate buckets located between the wheel buckets, a support for the intermediate buckets containing a chamber located between the casing and the wheel shaft, passages extending through certain of the buckets for conveying fluid into the chamber, and other passages extending through others of the buckets for conveying fluid from the chamber.

5. In a gas turbine, the combination of a wheel having buckets thereon, a combustion chamber, a nozzle for discharging the products of combustion directly against the buckets to cause rotation and so located that its discharge end is in close proximity to said buckets, and a casing for the wheel having a segmental annular opening in one side thereof adjacent the wheel buckets through which the nozzle extends, the said nozzle being separated from the wall of the opening by a passage through which air from the region surrounding the turbine passes to reduce the temperature of said nozzle.

6. In a gas turbine, the combination of a combustion chamber, a wheel having buckets mounted thereon, a nozzle that receives the products of combustion from said chamber and discharges them directly against the buckets, a casing that incloses the wheel and is provided with an opening in one side thereof opposite said buckets having diverging walls to receive the discharge end of the nozzle, the said nozzle being separated from the wall of the opening by a passage through which air flows to cool the nozzle, and a means for reducing the temperature of the casing.

7. In a gas turbine, the combination of a wheel carrying buckets, a combustion chamber, a nozzle that receives the products of combustion directly from said chamber and discharges them against the buckets, a casing for the wheel provided with a segmental annular opening in one side thereof having diverging walls between which the nozzle extends, the said nozzle being separated from the walls of the opening by a passage through which air flows to cool the nozzle, and radiating plates for the nozzle which also direct the passage of air through the opening.

8. In a gas turbine, the combination of a combustion chamber, a bucket wheel, a nozzle that receives the products of combustion from said chamber and discharges them against the wheel buckets, the arc covered by the end of the nozzle being less than the full circumference of the wheel, a chambered casing, certain walls of which closely surround the wheel buckets to reduce the rotation losses of the idle buckets, there being an arc-shaped opening in the casing opposite a portion of said buckets through which the nozzle projects, and means for admitting a cooling medium to the chamber in the casing and exhausting it therefrom.

9. In a gas turbine, the combination of wheel buckets, a casing therefor, removable intermediate buckets situated between the rows of wheel buckets and provided with radial passages for cooling fluid, a cooling means for the casing, means for supplying cooling fluid to the passages in the intermediate buckets that is separate from and performs its office independently of the cooling means for the casing, and one or more devices for discharging gas against the wheel buckets.

In witness whereof I have hereunto set my hand this second day of April, 1906.

SANFORD A. MOSS.

Witnesses:
    JOHN A. McMANUS, Jr.,
    ROBERT SHAND.